United States Patent
Archer et al.

(10) Patent No.: US 7,261,634 B2
(45) Date of Patent: Aug. 28, 2007

(54) AUTOMATICALLY DEPLOYABLE AND STORABLE COVER APPARATUS FOR DIRECTING COTTON FLOW FROM A CONVEYOR DUCT OF A COTTON HARVESTER TO A COTTON RECEIVER THEREOF

(75) Inventors: Tracy R. Archer, West Liberty, IA (US); Timothy A. Meeks, Davenport, IA (US); Earl R. Snyder, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/508,418

(22) Filed: Aug. 23, 2006

(65) Prior Publication Data

US 2007/0066373 A1 Mar. 22, 2007

Related U.S. Application Data

(62) Division of application No. 11/230,045, filed on Sep. 19, 2005.

(51) Int. Cl.
*A01D 17/02* (2006.01)
*A01F 12/46* (2006.01)

(52) U.S. Cl. .................................................. 460/114
(58) Field of Classification Search ............... 56/30, 56/32, 16.6, 13.3; 460/114; 406/159, 160, 406/162
See application file for complete search history.

(56) References Cited

U.S. PATENT DOCUMENTS

| | | | |
|---|---|---|---|
| 239,190 A | 3/1881 | Powell | 56/31 |
| 2,836,022 A | 5/1958 | Caldwell | 56/10 |
| 3,423,133 A | 1/1969 | Blanton | 302/61 |
| 3,451,725 A | 6/1969 | Waldrop | 302/34 |
| 4,005,565 A | 2/1977 | Lowe et al. | 56/344 |
| 4,205,468 A * | 6/1980 | Greider | 37/260 |
| 4,606,177 A | 8/1986 | Schlueter | 56/30 |
| 5,042,237 A | 8/1991 | Sanderson | 56/10.2 |
| 5,103,623 A | 4/1992 | Herrett | 56/14.7 |
| 5,189,870 A | 3/1993 | Hohni | 56/320.2 |
| 5,857,908 A | 1/1999 | Snyder et al. | 460/115 |
| 5,979,151 A | 11/1999 | Sanders et al. | 56/60 |
| 6,321,516 B1 | 11/2001 | Wigdahl et al. | 56/30 |
| 6,701,701 B2 | 3/2004 | Wigdahl et al. | 56/28 |

* cited by examiner

*Primary Examiner*—Árpád Fábián Kovács
(74) *Attorney, Agent, or Firm*—Michael G. Harms; John William Stader

(57) ABSTRACT

The apparatus for directing a flow of air and cotton from a cotton conveyor duct of a cotton harvester into a cotton receiver includes a cover member and a mounting element configured for mounting the cover member to a cotton conveyor duct for movement between a first position located at least partially in a path of a flow of air and cotton discharged through a discharge outlet of the duct, and a second position located adjacent to the path for directing the flow therealong. The cover member when in the first position is movable to the second position by a force exerted thereagainst by a flow of at least air discharged from the duct. A locking element of the apparatus is configured for automatically holding the cover member in the second position, the locking element being automatically operable for releasing the cover member when a downward force is applied thereagainst by the cotton receiver for moving the cover member to the first position.

3 Claims, 6 Drawing Sheets

AUTOMATICALLY DEPLOYABLE AND STORABLE COVER APPARATUS FOR DIRECTING COTTON FLOW FROM A CONVEYOR DUCT OF A COTTON HARVESTER TO A COTTON RECEIVER THEREOF

This divisional application claims priority under 35 U.S.C. § 120 from U.S. patent application Ser. No. 11/230,045 filed on Sep. 19, 2005 by Tracy R. Archer et al. with the same title, the full disclosure of which is hereby incorporated by reference.

TECHNICAL FIELD

This invention relates generally to a device or apparatus for directing and guiding a flow of cotton from a conveyor duct or pipe of a cotton harvesting machine into a cotton receiver such as a basket, packager, or other receiver of the machine, and more particularly, to an apparatus mountable adjacent to a discharge outlet of a cotton conveyor duct and including a cover member automatically movable by predetermined actions between a stored position which allows collapsing of the cotton receiver, and a deployed position for directing and guiding a flow of cotton from the duct into the receiver.

BACKGROUND ART

Presently, when harvesting cotton, in many instances, it is desirable to harvest as many rows of cotton plants as possible during a pass of a harvesting machine through a field of cotton plants. It is now common for as many as 6 rows of plants to be simultaneously picked from both sides. Typically, a cotton harvesting machine includes a plurality of side-by-side ducts or pipes extending upwardly from the picker units of the harvesting apparatus to an inlet opening of a cotton receiver. Some cotton receivers are typically baskets and may, or may not, include apparatus for packaging or compacting cotton received therein to some extent. The ducts extending in side-by-side relation from the picker units are typically positioned to propel flows of cotton and air through the inlet opening which typically extends across all or much of the sideward extent of the upper front end of the cotton receiver. The flows of air from the ducts are typically strong enough to carry at least some of the cotton through the upper region of the receiver into a rear region of the interior thereof. The receiver can include cotton compacting and distributing apparatus therein, such as a frame carrying one or more augers rotatable in one or both rotational directions for distributing the cotton within a lower region of the receiver, to the extent desired or required.

Typically, when a cotton receiver is filled to its capacity with cotton, or at other times, the receiver can be unloaded. Some cotton receivers are raised in their entirety f or unloading. For others, only the front end of the receiver is raised, so at to tilt the receiver for unloading. In both instances, the front end of the receiver is required to be moved away from the cotton ducts, which remain in their operational positions. Additionally, many cotton receivers are telescopically extended upwardly or otherwise enlarged for use, and are telescopically retracted or collapsed for travel over public roads and storage. When the cotton receiver is telescopically retracted or collapsed in a transport and storage mode, the ducts are also typically telescopically retracted or collapsed to a reduced height.

To ensure that all or substantially all of the cotton conveyed through the ducts flows into the cotton receiver, the cotton receiver typically includes one or more cover or hood members moved to, or placed in, a deployed position above the inlet openings of the cotton receiver and the discharge outlets of the ducts, for directing or guiding the air and cotton flows from the discharge outlets into the inlet openings. Presently, known embodiments of such cover and hood members are hingedly mounted to the receiver above the inlet opening, so as to be movable between a stored position typically located in or over the inlet opening so as to allow the upper portion of the receiver to be telescopically retracted into a lower portion of the receiver, and the deployed position extending forwardly in relation to the inlet opening.

The cotton receivers of at least some known harvesting machines are moved between their telescopically retracted and extended positions automatically using fluid cylinders provided for that purpose. The cotton conveying ducts of those machines are manually extended and retracted, but this is typically a relatively easy task as the ducts are readily accessible from a service platform of the harvesting machine. The hood or cover member or members are also presently manually deployed and stored, but this is a more difficult and time consuming task, and is undesirable, due to the location of the hood or cover member or members on the upper region of the cotton receiver.

Thus, what is sought is a device or apparatus for directing a flow of air and cotton from a cotton conveyor duct of a cotton harvester into a cotton receiver, which can be more advantageously deployed and stored, and which overcomes one or more of the problems and shortcomings set forth above.

SUMMARY OF THE INVENTION

What is disclosed is an apparatus or device for directing a flow of air and cotton from a cotton conveyor duct of a cotton harvester into a cotton receiver, which is more advantageously deployable and storable, and which overcomes one or more of the problems and shortcomings set forth above.

According to a preferred aspect of the invention, the apparatus includes a cover member and a mounting element configured for mounting the cover member to a cotton conveyor duct for automatic movement between a first or stored position advantageously located so as to allow telescopic retraction of a cotton receiver, and a deployed position for directing and guiding a flow of air and cotton from a discharge outlet of the duct to an inlet opening on an upper portion of the cotton receiver. In a preferred embodiment of the invention, in its first or stored position the cover member is positioned and configured so as to extend at least partially across the discharge outlet of the duct, or at least partially in a path of a flow of air and cotton discharged therethrough, so as to be automatically movable to the second or deployed position by a force exerted against the cover member by a flow of at least air, and usually also cotton, discharged from the duct.

The apparatus preferably includes a locking element configured for automatically holding the cover member in the second or deployed position, the locking element also preferably being automatically operable for releasing the cover member when a downward force is applied thereagainst, to allow the cover member to be automatically moved to the first or stored position. In this latter regard, the cover member, when in the deployed position, is preferably located so as to be contacted by an element on, or some portion of, the cotton receiver when moved downwardly to telescopically retracted or otherwise collapsed or reduce the height thereof, for moving the cover member to the first or stored position. As a result, automatic movement of the cover member between the stored and deployed positions thereof, in concert with the movement of the cotton receiver between its stored and deployed positions, is achieved.

According to another preferred aspect of the invention, the locking element is magnetic. That is, it is capable of magnetically holding the cover member in the second or deployed position, and releasing the cover member to allow it to move or be moved to the first or stored position by some action, for instance, by the downward movement of the cotton receiver to its stored position. As a preferred embodiment, the magnetic locking element can include a magnet disposed on an arm of or extending from the cover member, positioned so as to be brought into proximity or contact with a ferrous member on the duct, when the cover member is moved to the second or deployed position.

Thus, when the cotton receiver is in a telescopically retracted or other lowered position, and it is desired to render the cotton receiver operational, the receiver is telescopically or otherwise raised to its operational or deployed position. The cotton conveying ducts can be already extended or deployed, or can be extended or deployed at this time. The cover members will be in their first or stored positions on the ducts, located so as to be moved to their second or deployed positions by a predetermined action, such as the commencement of at least air, and more typically, air and cotton flow, through the discharge outlets and into the inlet opening of the cotton receiver. During the deployment and thereafter, the cover members will be positioned for guiding or directing the air and cotton flows into the inlet opening. Subsequently, when it is desired to render or transform the cotton receiver into its stored or transport mode, with some action, such as when the upper portion of the cotton receiver is lowered, the element or portion thereof positioned to contact the cover member will exert a sufficient force thereagainst for causing the locking element to release the cover member and allow it to move to the stored position, as effected by gravity, or the contact with the receiver as it is lowered, or a combination of both.

DETAILED DESCRIPTION OF THE INVENTION

Figure 1:
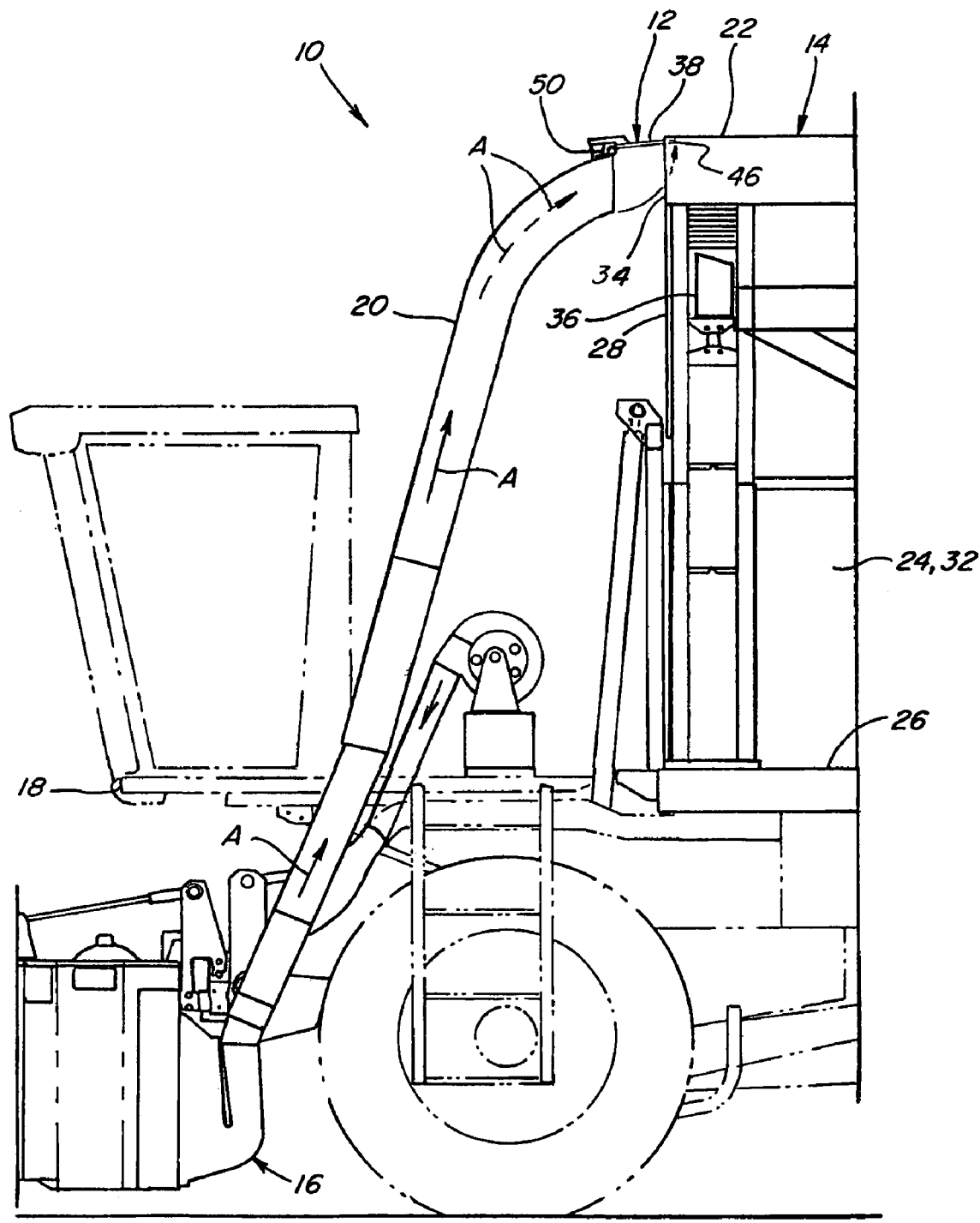
FIG. 1 is a simplified partial side view of the front end of a cotton harvesting machine, showing a cotton receiver and cotton conveying ducts of the machine, and also apparatus for directing a flow of air and cotton from the ducts to the cotton receiver according to the invention.
Figure 2:
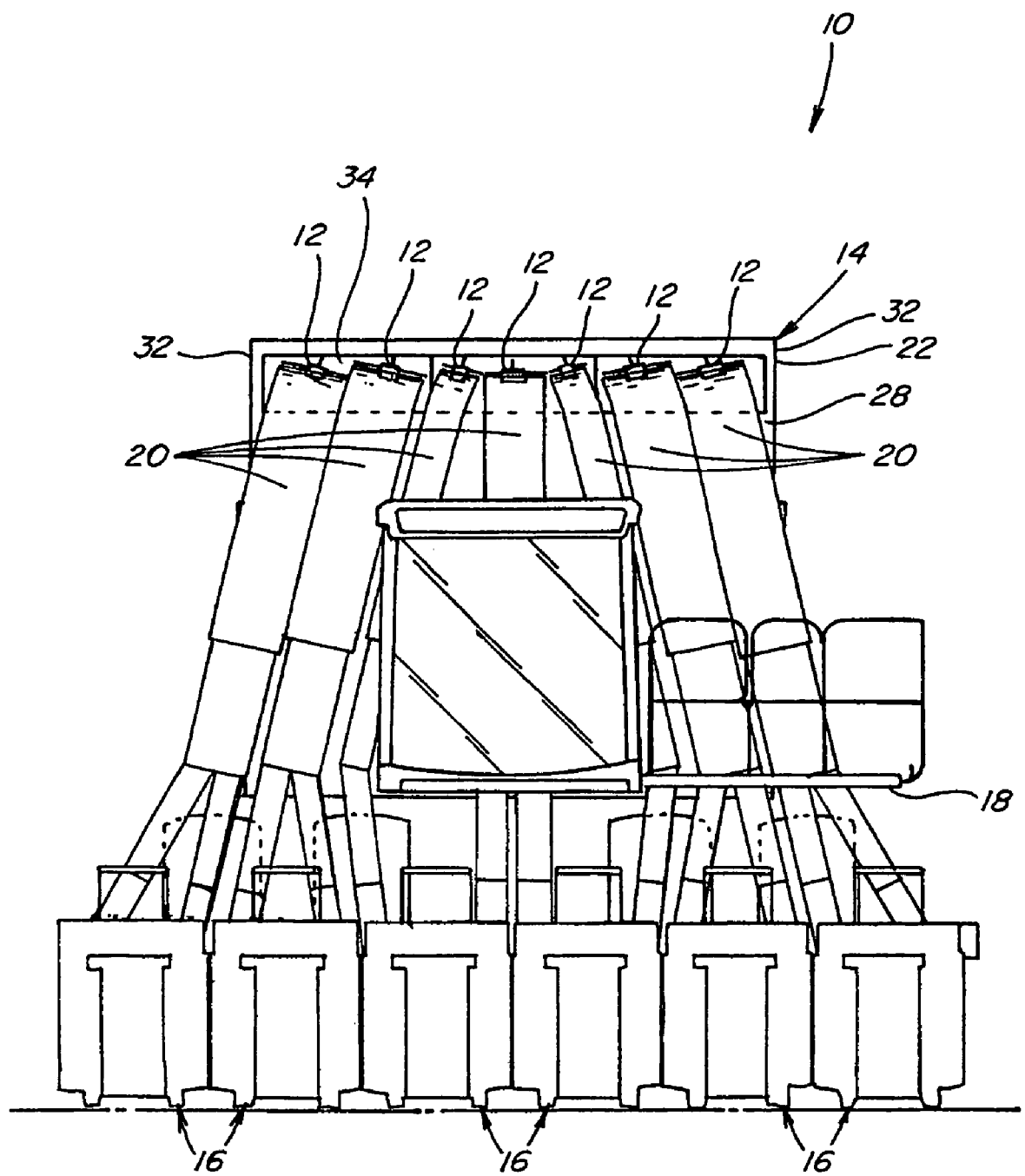
FIG. 2 is a simplified front view of the machine, showing the cotton receiver and ducts, and further illustrating the locations of the apparatus of the invention.

Referring now to the drawings, in FIGS. 1 and 2, a cotton harvesting machine 10 is shown, including a plurality of automatically deployable and storable cover apparatus 12 constructed and operable according to the teachings of the present invention, for directing individual flows of air and cotton into a cotton receiver 14 of machine 10. Harvesting machine 10 includes a plurality of harvesting units 16 arranged in a side-by-side array across a front end 18 of machine 10 for harvesting cotton from plants as machine 10 is moved in the forward direction along rows of the plants (not shown). The harvested cotton is conveyed by air flows individually through a side-by-side array of ducts 20 extending upwardly and rearwardly from units 16 into a front end 22 of cotton receiver 14, as denoted by arrows A in FIG. 1. The air flows are generated by a blower or blowers located on the machine.

Figure 3:
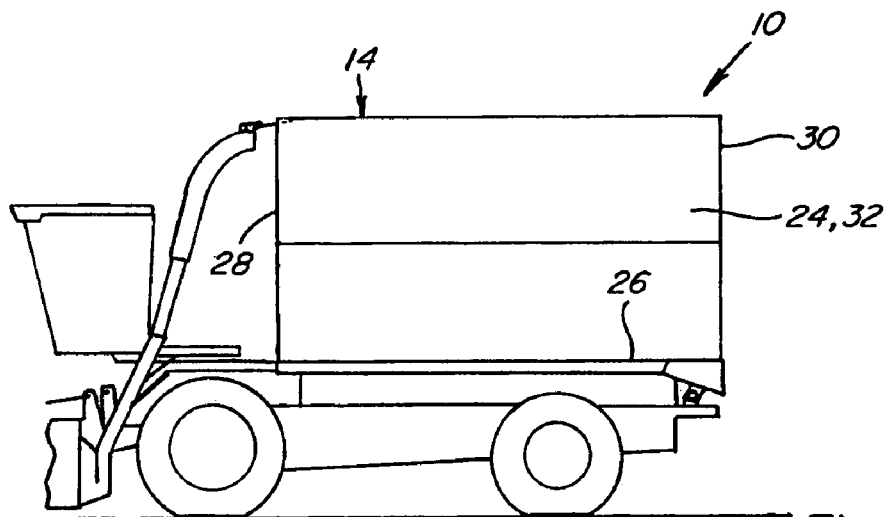
FIG. 3 is a simplified fragmentary side view of the harvesting machine of FIG. 1, showing the cotton conveying ducts and the cotton receiver in their deployed positions, and the apparatus of the invention in its deployed position.
Figure 4:
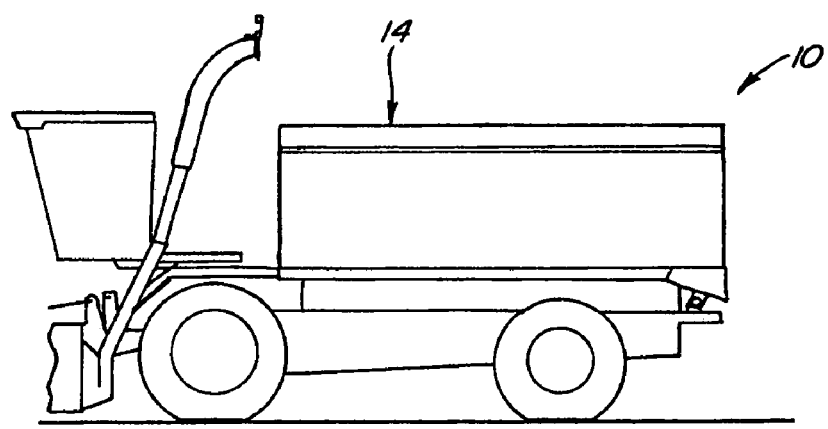
FIG. 4 is another simplified fragmentary side view of the machine, showing the cotton receiver in its stored position and the apparatus of the invention in its stored position.
Figure 5:
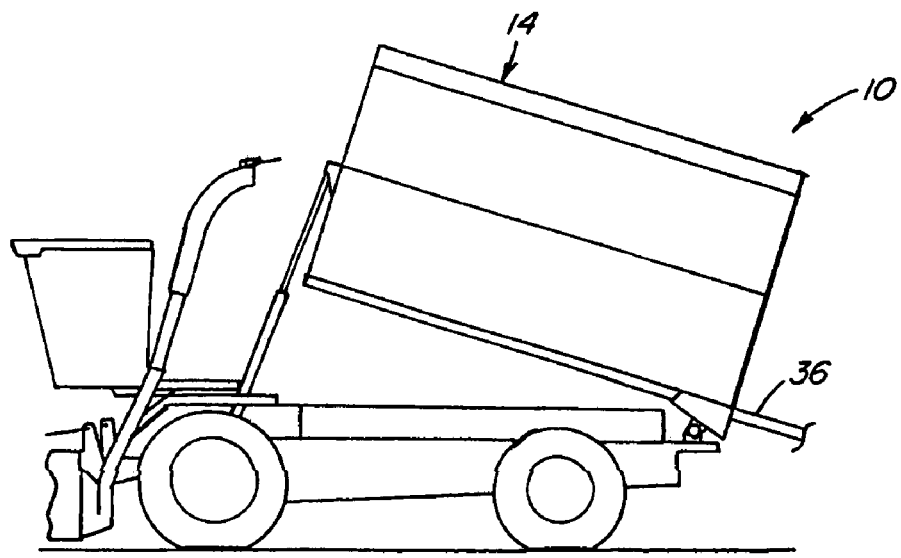
FIG. 5 is still another simplified fragmentary side view of the machine, showing the cotton receiver in an unloading position and the apparatus of the invention in its deployed position.
Figure 6:
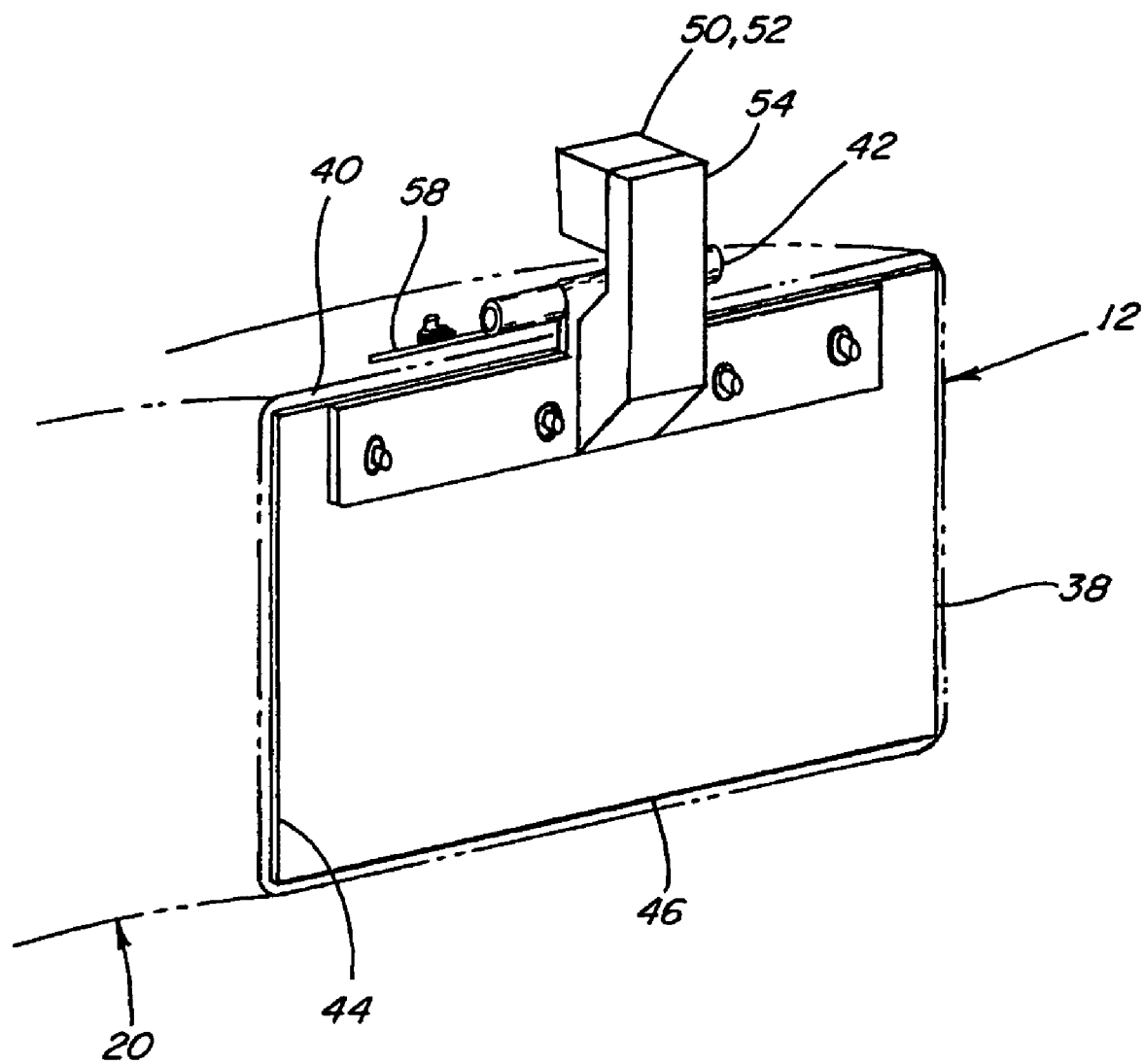
FIG. 6 is a perspective view of an apparatus of the invention shown in a stored position thereof in association with a cotton conveying duct.
Figure 7:
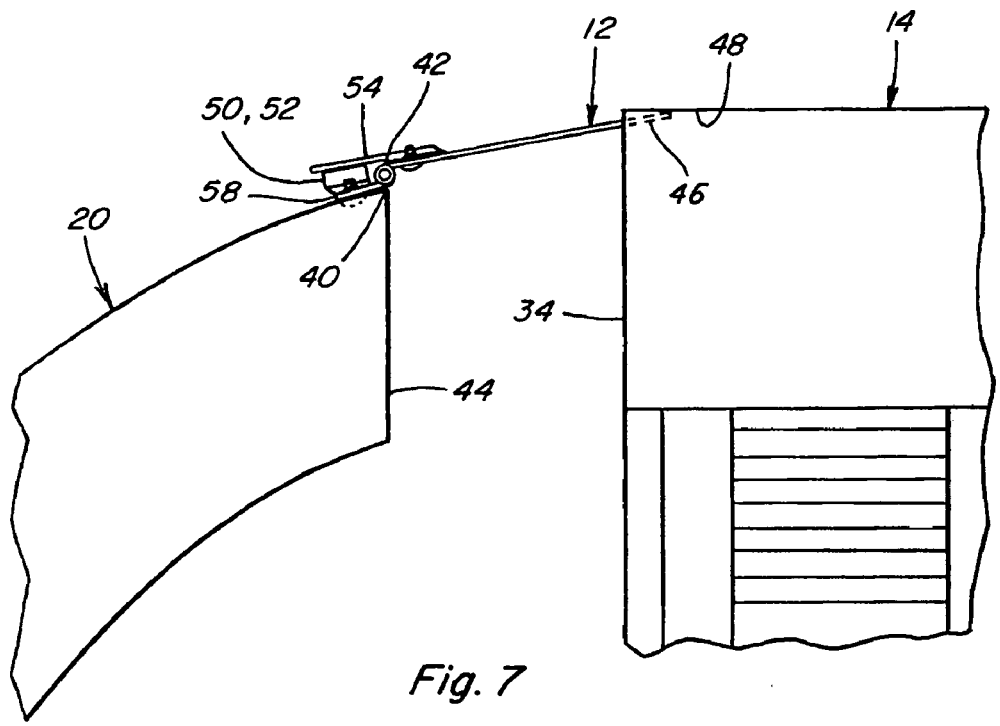
FIG. 7 is an enlarged fragmentary side view of a duct and the cotton receiver, showing the apparatus of the invention in a deployed position extending therebetween.
Figure 8:
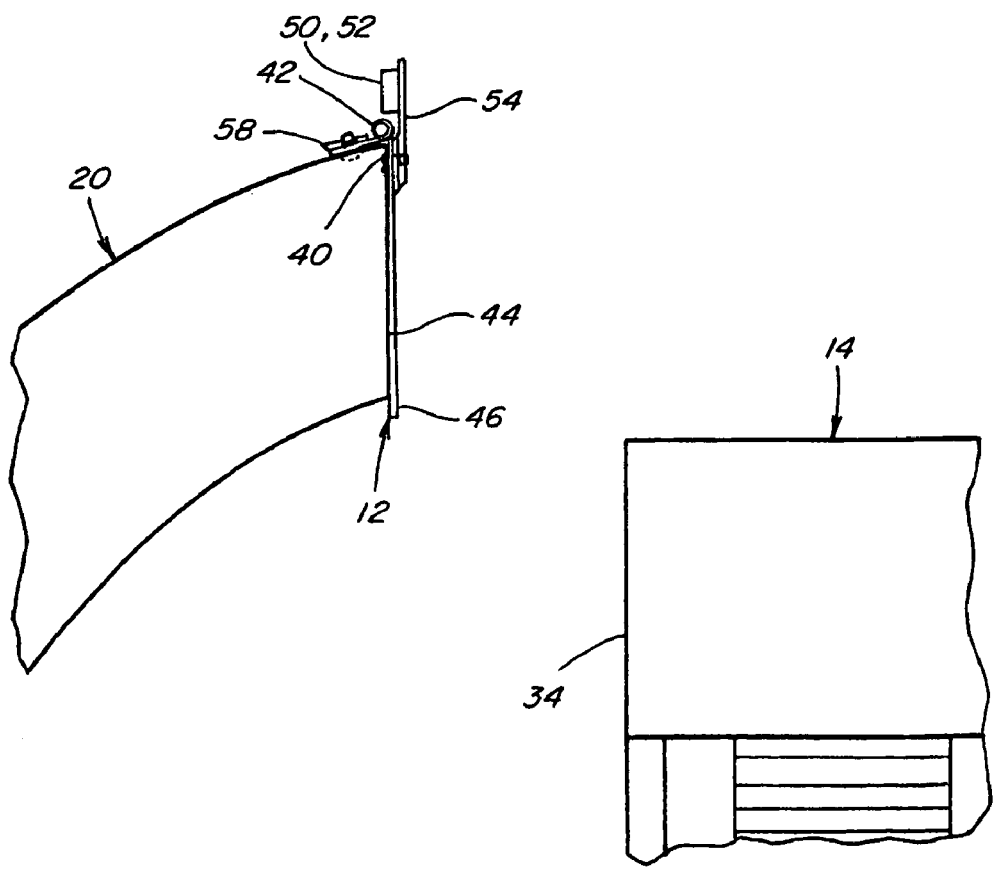
FIG. 8 is another fragmentary side view of the duct and cotton receiver, showing the cotton receiver in a lowered position and the apparatus of the invention in a stored position.

Referring also to FIGS. 3, 4 and 5, cotton receiver 14 is depicted as a modern cotton module builder, which is a structure of rectangular shape, including an interior cotton compacting chamber 24 defined by a floor 26, forward and rearward end walls 28 and 30, and opposing side walls 32. Receiver 14 is of telescopic construction, including an upper receiver portion which is telescopically receivable in a lower receiver portion for travel and storage, as illustrated in FIG. 4. At least end walls 28 and 30, and side walls 32, are preferably constructed of an air permeable material, such as a mesh or perforated sheeting having holes or openings therein adequate for dissipation of air flow therethrough, but which will retain the cotton therein.

Cotton receiver 14 is operable for receiving cotton conveyed thereto by ducts 20, into compacting chamber 24 through an elongate, sidewardly extending inlet opening 34 in an upper end of forward end wall 28, as shown in FIGS. 1 and 2. The cotton received in this manner is compacted within chamber 24 by compacting apparatus 36 located therein and operable for distributing the cotton within the chamber and compacting it against floor 26 into a unitary mass or module. The compacted unitary mass or module will have dimensions approximating the longitudinal and sideward extent of the interior of the receiver.

The compacted mass or module is unloadable from receiver 14 by tilting the forward end of receiver 14 upwardly, and conveying the module rearwardly therefrom over an unloading ramp deployable from the rear end of receiver 14, as illustrated in FIG. 5.

It can be observed from a study of the above discussed figures that the upper ends of ducts 20 are horizontally spaced from forward wall 28 of cotton receiver 14, which facilitates the telescoping movement of receiver 14 required for movement between the deployed position thereof (FIGS. 1, 2 and 3), and the stored or travel position (FIG. 4), and also the tilting of receiver 14 for unloading (FIG. 5).

Referring also to FIGS. 6, 7, 8, 9, 9a and 9b, cover apparatus 12 of each of ducts 20 preferably includes a generally flat cover member 38 of suitable rigid plastics or metal construction having an extent in the forward and rear direction which is sufficient to span the space between the upper end of the respective duct 20 and inlet opening 34 of receiver 14. Cover member 38 is preferably pivotally mounted to an upper edge 40 the respective duct 20 by a suitable pivoting element such as hinge 42 shown, for pivotal movement about a generally horizontal pivotal axis, between a first or stored position (FIGS. 6, 8 and 9b), extending at least partially across a discharge outlet 44 of the duct, and a second or deployed position at least substantially spanning the space between the duct 20 and the inlet opening 34, and more preferably completely spanning the space, such that a distal end 46 of cover member 38 extends into inlet opening 34 and abuts, or is located in close proximity to, an edge 48 defining a peripheral edge of opening 34, or another element in connection with receiver 14 and movable downwardly therewith. As a result, in the deployed position, cover member 38 provides a smooth, continuous extension of the upper portion of duct 20, into inlet opening 34, for guiding and directing the flow of cotton therein, without snagging and other problems.

When in its first or stored position, cover member 38 is preferably positioned and configured so as to extend at least partially across discharge outlet 44 of the duct 20, or at least partially in a path of a flow of air and cotton discharged therethrough (arrow A in FIG. 1), so as to be automatically movable to the second or deployed position by a force exerted against the cover member by at least the flow of air from the duct. Here, it should be recognized that the blower or blowers that generate flow A may be started prior to harvesting, and thus, there can be instances wherein it will be desired for just the flow of air, in the absence of cotton, to be capable of moving cover member 38 from its stored position to its deployed position.

Figure 9:
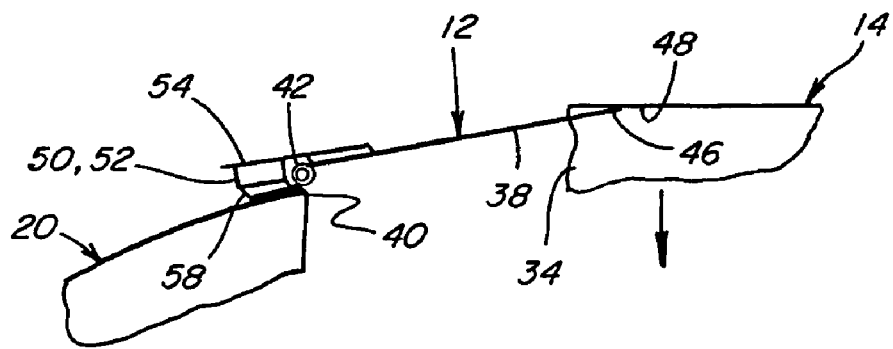
FIG. 9 is a simplified fragmentary side view of the duct and cotton receiver, showing the apparatus of the invention in its deployed position and in contact with an element of the cotton receiver.
Figure 9A:
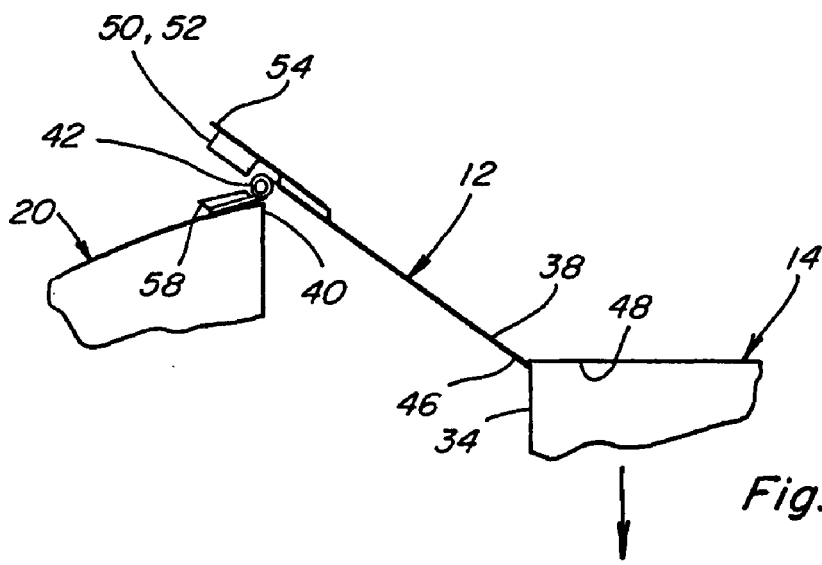
FIG. 9a is another simplified fragmentary schematic side view of the duct and cotton receiver, showing the cotton receiver in a lowered position for disengaging a locking element of the apparatus of the invention.
Figure 9B:
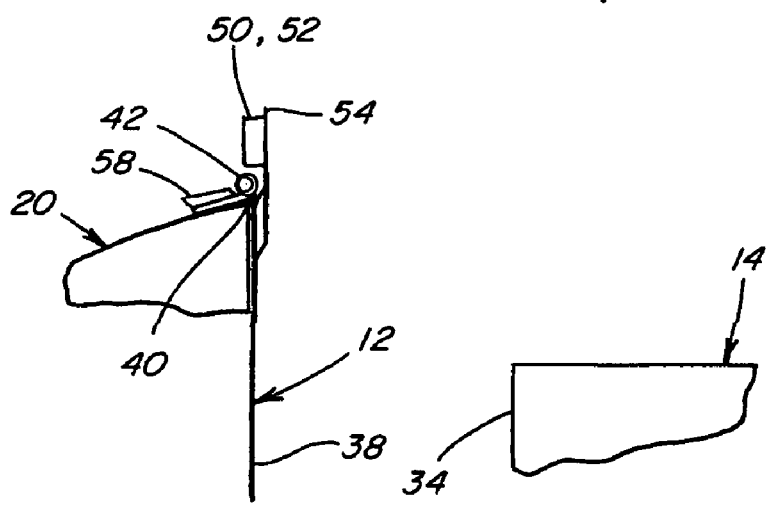
FIG. 9b is still another simplified fragmentary side view of the duct and cotton receiver, showing the receiver lowered and the cover member in its stored position.

Cover apparatus 12 additionally preferably includes a locking element 50 configured for automatically holding cover member 38 in the second or deployed position, locking element 50 also preferably being automatically operable for releasing cover member 38 when a downward force is applied thereagainst, to allow the cover member to be automatically moved to the first or stored position. In this latter regard, cover member 38, when in the deployed position, is preferably located so as to be contacted by an element on, or some portion of, cotton receiver 14 when moved downwardly to telescopically retracted or otherwise collapsed or reduce the height thereof, for moving the cover member to the first or stored position. In this embodiment, such element is edge 48 in inlet opening 34 of receiver 14, as illustrated by the sequence of FIGS. 9, 9a and 9b. As a result, automatic movement of cover member 38 between the stored and deployed positions thereof, in concert with the movement of cotton receiver 14 between its stored and deployed positions, is achieved.

Locking element 50 is preferably magnetic, including a magnet 52 at an appropriate location, such as shown on an arm 54 extending from cover member 38, for attracting a ferrous element, such as ferrous element 58 which is a small steel plate or fastener, shown located on duct 20 forwardly of hinge 42, magnet 52 being capable of magnetically holding cover member 38 in the second or deployed position, and releasing the cover member to allow it to move or be moved to the first or stored position by some action, for instance, by the downward movement of cotton receiver 14 to its stored position. As an alternative, the magnet 52 can be located on the duct 20 and the ferrous element 58 located on the cover member 38, as desired or required for a particular application.

Thus, when cotton receiver 14 is in its telescopically retracted or other lowered position, and it is desired to render it operational, the receiver 14 is telescopically or otherwise raised to its operational or deployed position. The cotton conveying ducts 20 can be already extended or deployed, or can be extended or deployed at this time. The cover members 38 will be in their first or stored positions on the ducts 20, located so as to be movable to their second or deployed positions by initiation of air the flow through the ducts. During the deployment and thereafter, the cover members 38 will be positioned for guiding or directing the air and cotton flows into the inlet opening. Subsequently, when it is desired to render or transform the cotton receiver 14 into its stored or transport mode, when the upper portion of the cotton receiver 14 is lowered, the edge 48 will exert a sufficient downward force against the cover member for causing the locking element 50 to release the cover member and allow it to move to the stored position, as effected by gravity, or the contact with the receiver as it is lowered, or a combination of both.

It will be understood that changes in the details, materials, steps, and arrangements of parts which have been described and illustrated to explain the nature of the invention will occur to and ray be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An automatically deployable and storable cover apparatus for a cotton conveyor duct of a cotton harvester, comprising:

a cover member pivotally mounted on a cotton conveyor duct so as to be located above a discharge outlet of the duct, the discharge outlet being spaced from an inlet opening of a downwardly movable cotton receiver, the cover member being pivotally movable between a first position extending at least partially across the discharge outlet, and a second position extending outwardly from the outlet toward the inlet opening of the cotton receiver, the cover member when in the first position being automatically pivotally movable to the second position by a force exerted thereagainst by a flow of air discharged from the outlet, the cover member when in the second position extending from the duct to a location below a structural element of the cotton receiver adjacent to an upper periphery of the inlet opening thereof so as to be positioned for directing a flow of air and cotton discharged from the discharge outlet into the inlet opening, and such that the structural element of the cotton receiver can be moved downwardly against the cover member to move the cover member to the first position; and a locking element configured for automatically holding the cover member in the second position and releasing the cover member when the structural element of the cotton receiver is moved downwardly thereagainst, for allowing the cover member to be moved thereby to the first position, wherein the locking element comprises a magnetic element disposed for magnetically holding the cover member in the second position.

2. The cover apparatus of claim 1, wherein the magnet is located on the cover member and the locking element further comprises a ferrous element in connection with the duct.

3. The cover apparatus claim 2, wherein the magnet is located on an arm extending from the cover member.

* * * * *